United States Patent

Lednor et al.

[11] Patent Number: 5,628,931
[45] Date of Patent: May 13, 1997

[54] PROCESS FOR THE PREPARATION OF HYDROGEN AND CARBON MONOXIDE CONTAINING MIXTURES

[75] Inventors: Peter W. Lednor, Amsterdam; Mathijs M. G. Senden, The Hague; Gerardus P. Van Der Zwet, Amsterdam, all of Netherlands

[73] Assignee: Shell Oil Company, Houston, Tex.

[21] Appl. No.: 499,153

[22] Filed: Jul. 7, 1995

[30] Foreign Application Priority Data

Jul. 7, 1994 [EP] European Pat. Off. .............. 94201970

[51] Int. Cl.$^6$ .................................................. C01B 3/26
[52] U.S. Cl. ................................................ 252/373
[58] Field of Search ............................... 252/373

[56] References Cited

U.S. PATENT DOCUMENTS

| | | | |
|---|---|---|---|
| 2,552,308 | 5/1951 | Buchmann et al. | 260/449.6 |
| 4,888,031 | 12/1989 | Martens | 48/197 R |
| 4,973,453 | 11/1990 | Agee | 422/190 |
| 5,023,276 | 6/1991 | Yarrington et al. | 514/703 |
| 5,112,527 | 5/1992 | Kobylinski | 252/373 |
| 5,186,859 | 2/1993 | Sie | 252/373 |
| 5,478,370 | 12/1995 | Spangler | 48/197 R |

*Primary Examiner*—Gary Geist
*Assistant Examiner*—Rosalynd Williams
*Attorney, Agent, or Firm*—Kim Muller

[57] ABSTRACT

A process for the preparation of a gaseous mixture containing hydrogen and carbon monoxide by autothermal reforming, comprising (i) partial oxidation of a gaseous hydrocarbon feed in a partial oxidation zone, (ii) passing the effluent of the partial oxidation zone to a reforming zone; and (iii) reforming in the presence of a reforming catalyst in the reforming zone to form a reformed product stream, wherein the partial oxidation is carried out at a $H_2C/C$ molar feed ratio of less than 0.2, and, preferably reformed product stream has a temperature in the range from 1000° to 1350° C., or wherein the reformed product stream has a temperature in the range from 1100° to 1300° C., and, preferably the partial oxidation is carried out at a $H_2O/C$ molar feed ratio of less than 0.5.

12 Claims, No Drawings

5,628,931

PROCESS FOR THE PREPARATION OF HYDROGEN AND CARBON MONOXIDE CONTAINING MIXTURES

FIELD OF THE INVENTION

The invention relates to a process for the preparation of gaseous mixtures containing hydrogen and carbon monoxide by autothermal reforming of methane containing feedstocks.

BACKGROUND OF THE INVENTION

In the industry, mixtures containing hydrogen and carbon oxides, in particular carbon monoxide, are of considerable importance. The mixtures, usually indicated as synthesis gas, find utilization in a number of well-known commercial processes such as the production of methanol, the synthesis of liquid hydrocarbons and the hydroformylation of olefins.

In the patent and non-patent literature, the said commercial processes have been extensively described and likewise many publications have issued relating to technical features of methods for producing the synthesis gas, to be used as feedstock for one of the aforesaid commercial outlets.

It was realized that the composition of a hydrogen and carbon monoxide containing mixture, suitable to be used as feedstock for one specific outlet, e.g. the production of methanol is not necessarily the same as that of a synthesis gas, intended to be used as starting material for another outlet, such as the production of liquid hydrocarbons.

Accordingly, methods have been developed whereby the process conditions applied in the preparation of a hydrogen and carbon monoxide-containing mixture are modified, for example in order to optimize the hydrogen/carbon monoxide ratio for the intended utilization, or to minimize the content of certain by-products in the mixture which could impede with the further processing thereof.

In EP 112613 various utilizations of hydrogen and carbon oxides containing mixtures are disclosed including the production of methanol, ammonia, synthetic natural gas and normally liquid hydrocarbons. The document in particular relates to the different process conditions and flow schemes which are used in the production of synthesis gas for each of the said utilizations.

As regards the production of liquid hydrocarbons, in the said document an operating scheme is recommended whereby a methane-containing feed is mixed with oxygen, steam and recycled carbon dioxide, the resulting mixture is preheated and is then passed to a reformer comprising a first and a second catalyst zone.

The first catalyst zone contains a partial oxidation catalyst containing palladium and platinum, supported on a honeycomb carrier. The second catalyst zone contains a platinum group metal steam reforming catalyst. The preheat temperature is preferably about 427° to 760° C., the temperature in the first catalyst zone about 954° to 1316° C. and the temperature at the exit of the second catalyst zone 954° C.

The effluent from the second catalyst zone is cooled and passed to a carbon dioxide removal zone. Carbon dioxide is recycled to the feed and the remaining stream is passed to a Fischer-Tropsch hydrocarbon synthesis plant.

For the production of liquid hydrocarbons on a commercial scale the aforesaid operating scheme is not considered attractive.

Large amounts of steam and $CO_2$ are added to the partial oxidation zone and, hence, at the exit of the second catalyst zone the effluent still contains excessive amounts of carbon dioxide and water. These compounds have to be separated off later in the process, before the reformed product can be used in the Fischer-Tropsch reactor. It would be desirable to be able to produce synthesis gas for use in a Fisher-Tropsch process for the preparation of liquid hydrocarbons without the need to add large amounts of $H_2$) and/or $CO_2$ to the process, inter alia in order to prevent soot formation.

Another known process for the production of synthesis gas is disclosed in EP 367654. The process comprises in a first step the partial combustion of a light hydrocarbon feed with oxygen in an amount of at most 50% of the stoichiometric amount required for total combustion, in the presence of steam in an amount less than 1.5 mole per carbon atom in the feed, and in a second step the contact between the combustion gas from the first step and a catalyst containing a Group VI and/or Group VIII metal or compound thereof at a temperature in the range of 800° to 1800° C., preferably of 900° to 1500° C.

It is described in this document that the catalyst in the second step reduces the amount of soot formed in the first step. The catalyst, however, does not substantially alter the composition of the combustion gas from the first step by reforming.

Christensen and Primdahl (Hydrocarbon Processing, March 1994, pages 39–46) describe difficulties and state of the art in autothermal reforming on a commercial scale. It is described in this publication that if it is desired to prepare a synthesis gas having a $H_2/CO$ molar ratio of about 2, for use as feed for the preparation of synthetic fuels, $CO_2$ addition is mandatory and the H20 molar ratio should be low, but above 0.5. The CO2/C molar ratio is typically in the range from 0.3 to 0.5

A disadvantage of $H_2O$ and $CO_2$ addition is that it gives rise to side-reactions which produce $CO_2$ and $H_2O$ respectively. The formation of $CO_2$ and the addition of is undesired as it gives rise to a non-optimal CO production and, hence, a loss of valuable carbon atoms. Further, $CO_2$ if present in high amounts in the synthesis gas, has to be separated from the synthesis gas before it can be used in a subsequent process for the preparation of liquid hydrocarbons. In this respect, requirements for a synthesis gas for the preparation of liquid hydrocarbons are different from e.g. requirements for a synthesis gas for the production of methanol. For the latter purpose it is advantageous if the synthesis gas contains an amount of $CO_2$.

According to Christensen and Primdahl, the $H_2O/C$ molar feed ratio should be higher than 0.5, typically at least 0.55 or 0.6, inter alia to avoid excessive soot formation.

It would be desirable to be able to operate under such conditions that no detectable soot is present in the synthesis gas and the synthesis gas can be used directly in a process for the preparation of liquid hydrocarbons, without excessive co-production of $CO_2$ from the synthesis gas.

Further, it would be desirable to be able to operate without excessive use of expensive oxygen and at a high conversion of gaseous hydrocarbon feed.

It has now surprisingly been found that by selecting the temperature of the reformed product stream within the range of 1100° to 1300° C., a suitable feedstock for the production of liquid hydrocarbons is obtained without detectable soot formation, and without requiring high amounts of $H_2O$, $CO_2$ and $O_2$ addition to the process.

SUMMARY OF THE INVENTION

The present invention relates to a process for the preparation of a gaseous mixture containing hydrogen and carbon monoxide by autothermal reforming, comprising (i) partial oxidation of a gaseous hydrocarbon feed in a partial oxidation zone;

(ii) passing the effluent of the partial oxidation zone to a reforming zone; and (iii) reforming in the presence of a reforming catalyst in the reforming zone to form a reformed product stream, such that the reformed product stream has a temperature in the range from 1100° to 1300° C.

Preferably, the partial oxidation is carried out at a $H_2O/C$ molar feed ratio of less than 0.5, more preferably less than 0.2.

The present invention also relates to a process for the preparation of a gaseous mixture containing hydrogen and carbon monoxide by autothermal reforming, comprising (i) partial oxidation of a gaseous hydrocarbon feed in a partial oxidation zone;

(ii) passing the effluent of the partial oxidation zone to a reforming zone; and (iii) reforming in the presence of a reforming catalyst in the reforming zone to form a reformed product stream; wherein the partial oxidation is carried out at a $H_2O/C$ molar feed ratio of less than 0.2.

DETAILED DESCRIPTION OF THE PREFERRED EMBODIMENTS

In the present specification the term "autothermal reforming" is used to indicate a process regime comprising a partial oxidation stage, followed by a catalytic reforming stage. In the partial oxidation stage, low boiling hydrocarbons, in particular methane, are partially oxidized to form mixtures containing hydrogen, carbon oxides, water and unconverted hydrocarbons.

In the catalytic reforming stage, involving reactions between hydrocarbons, carbon dioxide and water, additional amounts of hydrogen and carbon monoxide are formed.

If the partial oxidation is carried out at a $H_2O/C$ molar ratio of less than 0.2, the reformed product stream preferably has a temperature in the range from 1000° to 1350° C., more preferably from 1100° to 1300° C.

It will be appreciated that in a most preferred embodiment, the partial oxidation is carried out at a $H_2O/C$ molar feed ratio of less than 0.1, in particular about zero.

It has surprisingly been found that a low $H_2O/C$ molar ratio and/or a relatively high reformed product stream temperature, soot formation and soot in the reformed product stream is negligible, and reforming catalysts remain stable.

For the purposes of this specification the $H_2O/C$ molar ratio refers to the number of moles $H_2O$ per mole of carbon atoms. Similarly, the $CO_2/C$ molar ratio refers to the number of moles $CO_2$ per mole of carbon atoms, and the $O_2/C$ molar ratio refers to the number moles $O_2$ per mole of carbon atoms.

The number of moles of carbon atoms is obtained by adding together the number of moles of different carbon-containing compounds multiplied by the number of carbon atoms in the chemical formula of those compounds.

Accordingly, 1 mole ethane corresponds with 2 moles of carbon atoms.

Preferably, the $CO_2/C$ molar feed ratio in the partial oxidation zone is less than 0.2, more preferably less than 0.1.

Most surprisingly, it has been found possible to produce synthesis gas mixture having a $H_2O/CO$ molar ratio of less than 2.2 without the addition of $CO_2/O$ molar feed ratio will not be zero in view of any $CO_2$ present in the gaseous hydrocarbon feed, especially if natural gas is used as gaseous hydrocarbon feed.

The gaseous hydrocarbon mixture used as feedstock for the autothermal reforming treatment, usually contains a substantial amount of methane. In principle, however, hydrocarbon mixture may be used which is gaseous at standard temperature and pressure. A preferred gaseous hydrocarbon source, which is readily available and therefore suitable for large-scale operations is natural gas. The methane content of natural gas is usually at least 80% by volume and often more than 90%. In addition, natural gas may contain minor amounts of other hydrocarbons such as ethane and propane and nonhydrocarbons, such as nitrogen- and sulphur-containing compounds.

The amount of non-hydrocarbons is typically less than 10%, preferably less than 5% by volume.

As oxidant, any oxygen-containing gas may be used such as oxygen-enriched air, purified or pure oxygen. In order to minimize the nitrogen content of the autothermal reforming feedstock, it is preferred to use molecular oxygen as the oxidant. Conveniently, the methane source and the oxidant are introduced together into the partial oxidation zone. The oxidation in that zone is initiated, e.g. by using a spark plug.

By proper selection of the molar ratio between the reactants introduced in the partial oxidation zone, a certain amount of heat is produced, provided by the exothermic oxidation reaction. It will thus be possible to establish a preferred temperature profile in that zone.

Preferably, the molar ratio between the reactants and the heat supplied to the partial oxidation zone are selected such that the temperature of the effluent from that zone is in the range of 1100° to 1400° C.

If desired, the partial oxidation may proceed in the presence of a catalyst. However, since the stability of the majority of the known catalysts at the envisaged temperature range forms a problem, it is preferred to operate the partial oxidation without using a catalyst, but with the aid of a burner.

Conveniently and preferably, a burner of the co-annular type is applied. Co-annular (multi-orifice) burner are known to those skilled in the art and comprise a concentric arrangement of μ passages or channels co-axial with the longitudinal axis of those burners, wherein μ is an integer $\geq 2$. Examples of suitable co-annular burners have been disclosed in EP-A-0 545 281 and DE-OS-2 935 754.

The gaseous hydrocarbon feed and an oxygen-containing gas as defined hereinabove are supplied to the partial oxidation zone through the co-annular burner. As outlined herein-above, $H_2O$ and/or $CO_2$ can also be fed to the partial oxidation zone, typically through the co-annular burner.

The molar ratios between oxygen and carbon atom (e.g. methane) required to ensure that the temperature of the effluent from the partial oxidation zone is within the desired range are usually in the range of 0.5:1 to 0.9:1, preferably in the range of 0.6:1 to 0.8:1.

According to another aspect of the invention, it is also possible, in order to achieve that the temperature of the effluent from the partial oxidation zone is high (preferably within the preferred range from 1100° to 1400° C.), while the consumption of relatively expensive oxygen is kept low, to introduce less than the total amount of gaseous hydrocarbon feed at the inlet of the partial oxidation zone, thus increasing the molar ratio between oxygen and carbon ($CO_2/C$) in that part of said zone and to supply the remainder of the gaseous hydrocarbon feed to the reforming zone. Accordingly, in a further aspect, the present invention relates to a process for the preparation of a gaseous mixture containing hydrogen and carbon monoxide by autothermal reforming, comprising (i) partial oxidation of a gaseous hydrocarbon feed in a partial oxidation zone;

(ii) passing the effluent of the partial oxidation zone to a reforming zone; and (iii) reforming in the reforming zone in the presence of a reforming catalyst to form a preformed product stream at elevated temperature, wherein part of the gaseous hydrocarbon feed is fed to the reforming zone.

Preferably, the amount of gaseous hydrocarbon feed introduced to the reforming zone is in the range of 10 to 20% of the total of gaseous hydrocarbon feed used in the process.

It is preferred to supply part of the required heat by preheating the gaseous hydrocarbon feed source, before the gaseous hydrocarbon feed is introduced in the partial oxidation zone. Also, the oxidant may be preheated. The preheated streams are subsequently passed to the partial oxidation zone, usually via a burner.

The preheating is preferably carded out such that the preheated methane source has a temperature in the range of 350° to 500° C. and the preheated oxidant has temperature in the range of 150° to 250° C.

The further heat required for operating the process in the partial oxidation zone is substantially provided by reaction itself, ensuring that the effluent from that zone is at a temperature within the envisaged range.

As indicated above, a high temperature prevailing in the partial oxidation zone is advantageous for thermodynamic reasons. The formation of hydrogen and carbon monoxide is enhanced and the reverse formation of methane and water is suppressed.

Furthermore, at these high temperatures the formation of soot is reduced.

A further advantage inherent in the high temperature level of the effluent from the partial oxidation zone, consists in that the heat required in the endothermic catalytic reforming, or at least a substantial proportion of that heat, is provided directly by introducing the partial oxidation effluent into the catalytic reforming zone.

The effluent from the partial oxidation zone typically comprises large amounts of hydrogen and carbon monoxide, e.g. of about 50 and 30 mol %, respectively and minor amounts of carbon dioxide, unconverted methane, steam and nitrogen. This effluent is suitably introduced directly into the catalytic reforming zone. To this zone also additional steam and/or $CO_2$ may be introduced, usually as a separate stream. Steam and $CO_2$ in the effluent from the partial oxidation zone and any additional steam and/or $CO_2$ will be involved in the formation of further amounts of carbon monoxide and hydrogen, by reaction with methane, not yet converted in the partial oxidation zone.

Any heat required in the catalytic reforming zone which is not already supplied by the effluent from the partial oxidation zone, may be provided by adequate preheating of the additional steam and/or $CO_2$. If desired, this heat may also be generated by external means such as heating coils.

In the process of the invention it is essential that sufficient heat is provided to the catalytic reforming zone to ensure that the temperature of the effluent from that zone is at the desired level.

As explained above, this heat is available from the effluent of the partial oxidation zone, possibly supplemented by any heat generated by external means or originating from preheated steam or $CO_2$.

The high temperature prevailing in the catalytic reforming zone entails the requirement to use a catalyst which is capable to substantially retain its catalytic activity and stability during a considerable number of runhours.

Suitable catalysts include catalysts containing one or more metals from Group VIII of the Periodic Table, preferably one or more noble metals of Group VIII or nickel.

Preferred catalysts are based on platinum as Group VIII metal, optionally in combination with other noble metals such as palladium and rhodium or non-noble metals such as lanthanum and cerium.

Preferred carder materials are refractory oxides, more preferably single thermally stable oxides or mixtures thereof such as silica and, in particular, alpha-aluminas and hexa-aluminates.

The shape of the carder particles may vary considerably. Favorable results are especially obtained with alpha-alumina rings and trilobe materials.

It has been observed that the performance of the catalyst used in the catalytic reforming is influenced by the preparation of the catalyst. It is recommended to prepare a catalyst, by impregnating a Group VIII noble metal compound or nickel compound on a suitable carder material, but other methods of depositing catalytically active metals onto a carrier may also be applied. This deposition step is usually followed by a calcination treatment, e.g. at a temperature in the range of 400°–1100° C. The calcination treatment is typically effected in (enriched) air or oxygen.

Preferred calcination temperatures are in the range of 400° to 650° C., more preferably in the range of 450° to 600° C.

The amount of noble metal(s) typically present in the catalyst is known to the skilled person and may depend on the type of metal(s) that is(are) present in the catalyst.

The amount of noble metal(s) of noble Group VIII in the catalyst is typically in the range of 0.4 to 8% by weight, preferably in the range of 1 to 6% by weight, based on the total catalyst. The amount of non-noble metal(s) of Group VIII in the catalyst usually ranges from 1 to 40% by weight, preferably 5 to 30% by weight, based on the total catalyst.

The autothermal reforming according to the invention advantageously comprises a partial oxidation stage, followed by a catalytic reforming stage whereby the catalyst is present as a fixed bed. The process may be operated in upward-flow or downward-flow. Conveniently the process is operated such that the two reaction zones are arranged within a single reactor housing.

The reformed product stream is eminently suitable to be used as feedstock for a process for the manufacture of hydrocarbons which, under normal temperature and pressure conditions, are liquid.

In practice, the said product stream having a temperature in the range of 1000 to 1350° C. is first cooled, preferably with the aid of a heat-exchanger and then passed to the liquid hydrocarbon production unit. Suitable conditions for the production of liquid hydrocarbons are described in European patent No. 0 428 223.

The heat generated in the heat exchanger may be used elsewhere in the process of the invention, for example for preheating the methane source, or the oxygen source supplied to the partial oxidation zone.

The invention is further illustrated by the following examples, which are included for illustrative purposes only and are not meant to limit the invention.

EXAMPLE 1

In order to demonstrate that part of the gaseous hydrocarbon feed can be advantageously fed to the reforming zone the following experiment was carried out.

For the preparation of mixtures containing hydrogen and carbon monoxide a vertically located tubular reactor was used, comprising at the bottom end a first reaction zone for the partial oxidation of natural gas and at the top end a second reaction zone for the catalytic reforming of partially oxidized hydrocarbons obtained in the first reaction zone.

The first reaction zone comprised at the bottom two inlets, each being equipped with a burner.

The second reaction zone was provided with a catalyst in the form of a supported fixed bed of catalyst particles.

Via the inlets at the bottom of the first reaction zone a gas stream comprising natural gas was supplied, preheated to 200° C. and a mixture of oxygen and steam, preheated at 185° C. The weight ratio between natural gas, oxygen and steam was 1:1.3:0.3. The natural gas flow rate was 135 kg/h.

The pressure in the first reaction zone was 30 barg and the temperature at the outlet was 1340° C. Via a number of inlets located between the outlet of the first reaction zone and the inlet of the second reaction zone, a mixture of 18 kg/h of natural gas and 10 kg/h of steam was introduced and mixed with the effluent from the first reaction zone (355 kg/h).

The resulting gas mixture having a temperature of ca. 1240° C. was passed into the second reaction zone which contained a fixed bed of a commercially available steam reforming catalyst (RKS-2-7H, manufactured by Haldor Topsoe). The effluent leaving the second reaction zone with an hourly space velocity of 57000 Nl/l/h had a temperature of circa 1020° C.

The composition of the gas streams at the inlet and the outlet of the second reaction zone was measured by analyzing a small side stream of the gas at these locations. The analyses were made with the aid of gas liquid chromatography. HCN was determined by scrubbing the gas with an acidic solution, followed by spectrographic analysis.

The analytical results are shown in the following table (the thermodynamic equilibrium values are given between brackets).

TABLE 1

| Compound | Inlet catalytic reforming reactor (mol %) | Outlet catalytic reforming reactor (mol %) |
| --- | --- | --- |
| $H_2$ | 52.1 (57.7) | 56.4 (56.4) |
| CO | 29.8 (31.0) | 28.9 (29.0) |
| $CO_2$ | 8.1 (5.7) | 8.0 (7.9) |
| $CH_4$ | 4.2 (0.0) | 1.0 (1.0) |
| $N_2$ | 5.8 (5.6) | 5.7 (5.7) |

From these results it can be seen that the composition of the gas at the inlet of the catalytic reforming zone deviates significantly from equilibrium, but that the gas at the outlet of the reactor is approximately at thermodynamic equilibrium.

The gas composition leaving the catalytic reforming zone can suitably be used in a subsequent process step for the manufacture of higher paraffins such as described in European Patent No. 0428223.

EXAMPLE 2

In a reactor of the type as described in Example 1, an experiment was carried out comprising the partial oxidation of natural gas in the absence of steam, followed by catalytic reforming using a fixed bed of a commercially available catalyst (RKS-2-7H, manufactured by Haldor Topsoe).

The conditions and results are shown in the following table.

TABLE 2

| | |
| --- | --- |
| Weight ratio natural gas:oxygen | 1:1.4 |
| Temperature effluent partial oxidation zone, °C. | 1290 |
| Pressure, barg | 30 |
| Temperature effluent reforming zone, °C. | 1200 |

The composition of the gas leaving the reforming zone, the reformed product stream, was as follows.

| | |
| --- | --- |
| $H_2$: | 45.9 mol % |
| CO: | 29.0 mol % |
| $CO_2$: | 4.2 mol % |
| $CH_4$: | 0.02 mol % |
| $H_2O$: | 16.2 mol % |
| $N_2$: | 4.7 mol % |

This composition was at thermodynamic equilibrium. No soot could be detected (detection limit 10 ppm-w.) in the reformed product stream.

The catalyst did not show any signs of deactivation during the experiment which lasted for 16 hrs. Prior to this experiment, the catalyst had been used for 83 hrs. The catalyst had not shown any signs of deactivation in this period either.

The effluent from the catalytic reforming zone can suitably be used in a subsequent process step for the manufacture of higher paraffins with the aid of a Fischer-Tropsch type catalyst.

EXAMPLE 3

In one aspect of the invention, the partial oxidation carried out at a $H_2O/C$ molar feed ratio of less than 0.2, and, preferably, the process is carried out such that the reformed product stream has a temperature in the range from 1000° to 1350° C.

Five reforming catalysts were prepared by aqueous impregnation of a metal compound onto extrudates of alpha-aluminas.

The impregnated compositions were calcined at 500° C. during 1 h. The activity of the catalysts was tested in the aforementioned range by passing a syngas feed over the catalysts and determining the amounts of methane and carbon dioxide in the effluent from the reaction zone.

The composition of the syngas feed was as follows:

$CH_4$: 5.5 mol %

CO: 24.9 mol %

$CO_2$: 3.3 mol %

$H_2$: 54.2 mol %

$H_2O$: 12.2 mol %

Conditions and results are shown in the following table. The figures between brackets refer to the thermodynamic equilibrium values.

It can be seen that the reforming catalysts are active over a broad reaction temperature range of 1000°–1350° C.

In the experiments described in the Example, the temperature of the reformed product stream was equal to the reaction temperature given in the Table.

TABLE 3

| Catalyst | 1 | 1 | 2 | 3 | 4 | 5 |
|---|---|---|---|---|---|---|
| Metal content, % w | Pt, 1 | Pt, 1 | Pt, 0.5; Pd, 0.3; Rh, 0.1 | Pt, 0.5; Pd, 0.3; Rh, 0.1 | Pt, 0.5 | Pt, 0.5 |
| Type of alumina support | (Dycat) extrudate | (Dycat) extrudate | EO 23A, rings extrudates | EO 23A, rings extrudates | Trilobes | Trilobes |
| Temperature reaction zone, °C. | 1350 | 1100 | 1000 | 1000 | 1000 | 1000 |
| $CH_4$ in effluent, mol % | 0.0 | 0.4 | 0.7 | 0.4 | 0.5 | 0.4 |
| (thermodyn. equil. mol %) | (0.0) | (0.0) | (0.25) | (0.25) | (0.25) | (0.25) |
| $CO_2$ in effluent, mol % | 1.3 | 2.3 | 2.3 | 2.2 | 2.3 | 2.3 |
| (thermodyn. equil. mol %) | (1.2) | (1.6) | (1.99) | (1.99) | (1.99) | (1.99) |
| Hourly space velocity, Nl/l/h | 20,000 | 20,000 | 50,000 | 50,000 | 50,000 | 50,000 |
| Pressure, barg | 2 | 2 | 5 | 5 | 5 | 5 |

EXAMPLE 4

A catalyst was prepared, substantially as described in Example 3 with respect to catalyst 4, with the difference that the impregnated composition was calcined at 500° C. for 1 hour and subsequently at 1100° C. for 2 hours.

The activity of the catalyst was tested under the same conditions as catalyst 4.

The amounts of $CH_4$ and $CO_2$ in the effluent from the reaction zone were 4.5 and 3.5 mol %, respectively.

Therefore, the activity of this catalyst under the test conditions is less than the activity of the catalyst 4, which had only been calcined at 500° C. for 1 hour.

What is claimed is:

1. A process for the preparation of a gaseous mixture containing hydrogen and carbon monoxide by autothermal reforming, comprising
   (i) partial oxidation of a gaseous hydrocarbon feed in a partial oxidation zone;
   (ii) passing the effluent of the partial oxidation zone to a reforming zone; and
   (iii) reforming in the presence of a reforming catalyst in the reforming zone to form a reformed product stream, such that the reformed product stream has a temperature in the range from 1100° to 1300° C.

2. The process of claim 1 wherein the partial oxidation is carried out at a $H_2O/C$ molar feed ratio of less than 0.5.

3. The process of claim 2 wherein the $H_2O/C$ molar feed ratio is less than 0.2.

4. The process of claim 1 wherein in the partial oxidation zone the $O_2/C$ molar feed ratio is in the range from 0.6 to 0.8.

5. The process of claim 1 wherein the partial oxidation zone the $CO_2/C$ molar ratio feed ratio is less than 0.2.

6. The process of claim 5 wherein the $CO_2/C$ molar feed ratio is less than 0.1.

7. The process of claim 1 wherein the reforming catalyst comprises one or more metals from Group VIII of the Periodic Table.

8. The process of claim 7 wherein the reforming catalyst comprises one or more noble metals from Group VIII or nickel.

9. The process of claim 8 wherein the catalyst comprises platinum.

10. The process of claim 9 wherein the catalyst comprises a refractory oxide carrier.

11. The process of claim 10 wherein the catalyst is calcined at a temperature in the range from 400° to 650° C.

12. The process of claim 1 wherein the partial oxidation zone a co-annular burner is used.

* * * * *